United States Patent [19]
Hayden

[11] Patent Number: 5,910,764
[45] Date of Patent: Jun. 8, 1999

[54] BRAKE LIGHT SYSTEM FOR HELMETS

[76] Inventor: Dwayne E. Hayden, 7400 Countrywood Ave., NW, Alberquerque, N.M. 87120

[21] Appl. No.: 09/105,889

[22] Filed: Jun. 26, 1998

[51] Int. Cl.[6] .................................................. B60Q 1/44
[52] U.S. Cl. ..................... 340/479; 340/467; 340/691.1; 340/693.5; 362/106
[58] Field of Search .................................... 340/432, 453, 340/464, 465, 466, 467, 468, 475, 479, 691.1, 693.5; 362/106

[56] References Cited

U.S. PATENT DOCUMENTS

| | | | |
|---|---|---|---|
| 3,720,918 | 3/1973 | Perl | 340/473 |
| 4,195,328 | 3/1980 | Harris, Jr. | 362/72 |
| 4,559,516 | 12/1985 | Schott et al. | 340/475 |
| 4,559,586 | 12/1985 | Slarve | 362/106 |
| 4,760,373 | 7/1988 | Reilly | 340/432 |
| 4,862,331 | 8/1989 | Hanabusa | 362/106 |
| 4,891,736 | 1/1990 | Gouda | 362/105 |
| 4,956,752 | 9/1990 | Fogietti | 340/432 |
| 5,040,099 | 8/1991 | Harris | 362/72 |
| 5,353,008 | 10/1994 | Eikenberry et al. | 340/479 |
| 5,704,707 | 1/1998 | Gebelein et al. | 340/479 |

Primary Examiner—Daniel J. Wu
Attorney, Agent, or Firm—Joseph N. Breaux

[57] ABSTRACT

A helmet brake light system which includes a helmet, a helmet brake light coupled to the rear of the helmet, a light intensity detector coupled in close proximity to the motorcycle's brake light and an electrical cable electrically coupled to a battery source in the helmet and the light intensity detector. When the motorcycle's brake light illuminates, the light intensity detector detects the illumination of the motorcycle's brake light and activates the helmet brake light.

8 Claims, 2 Drawing Sheets

BRAKE LIGHT SYSTEM FOR HELMETS

TECHNICAL FIELD

The present invention relates to brake lights for helmets and, more particularly, to a brake light system for helmets which includes a helmet, a helmet brake light coupled to the rear of the helmet, a light intensity detector coupled in close proximity to the motorcycle's brake light and an electrical cable electrically coupled to the helmet brake light and the light intensity detector wherein when the motorcycle's brake light illuminates, the light intensity detector detects the illumination of the motorcycle's brake light and activates the helmet brake light.

BACKGROUND OF THE INVENTION

In recent years, the automobile manufactures have added an additional braking light positioned in the center of the rear windowshield thereby positioned such added braking light above the standard braking lights and in the direct line-of-sight of the driver directly behind the vehicle. Henceforth, the quickness in observing a slowing or stopping vehicle was increased since the additional brake light was essentially placed in the direct line-of-sight of the rearward vehicle. A can be appreciated, to add an additional braking light to the rear of a motorcycle or other open motorized recreational vehicle in the direct line-of-sight of a trailing vehicle would thus be advantageous. Therefore, several attempts have been made to include a braking light on the rear of a helmet.

For example, U.S. Pat. No. 5,353,008, to Eikenberry et al., entitled "HEADGEAR WITH SAFETY LIGHT" discloses a motorcycle helmet with a brake light. The brake light is turned on via a receiver which detects an RF signal from a transmitter located on the motorcycle.

U.S. Pat. No. 4,760,373, to Reilly, entitled "MOTORCYCLE HELMET CONTAINING AN AUTOMATIC BRAKE LIGHT" discloses a helmet having a backward facing warning light which shines when the motorcycle's brake pedal is depressed. A transmitter with an encoder located on the motorcycle communicates with a receiver with a decoder. Further provided is a code card to guarantee both the encoder settings and the decoder switch settings are identical.

U.S. Pat. No. 4,2449,586, to Slarve, entitled "SAFETY HELMET" discloses a helmet having an auxiliary brake lamp secured thereto and connected via a quick detachable electrical connector in parallel with the brake lamp of the motorcycle.

As can be readily seen, in general, the prior helmet brake light systems are in some way directly connected to the motorcycle's electrical system. Since the present invention utilizes a light intensity detector to detect the illumination of the rear brake light of the motorcycle, the helmet brake light system is not in any way electrically coupled to the motorcycles electrical system.

While each of the above helmet brake light systems function as desired, none of them have a brake light system for helmets which includes a helmet, a helmet brake light coupled to the rear of the helmet, a light intensity detector coupled in close proximity to the motorcycle's brake light and an electrical cable electrically coupled to the helmet brake light and the light intensity detector wherein when the motorcycle's brake light illuminates, the light intensity detector detects the illumination of the motorcycle's brake light and activates the helmet brake light.

Other patents in the art include U.S. Pat. No. 4,559,516, to Schott et al., entitled "HELMET WITH TURN SIGNAL" which discloses a helmet having turn signal indicators activated by head tilt switches response to momentary tilting of the wearer's head. U.S. Pat. No. 4,195,328, to Harris, Jr., entitled "OPEN VEHICLE LIGHTING SYSTEM UTILIZING DETACHABLE VEHICLE OPERATOR HELMET MOUNTED LIGHT", and U.S. Pat. No. 3,720,918, to Perl, entitled "VEHICLE INDICATOR", are directed to various light indicators for helmets.

As will be seen more fully below, the present invention is substantially different in structure, methodology and approach from that of the prior helmet brake light systems.

SUMMARY OF THE INVENTION

The preferred embodiment of the helmet brake light system of the present invention solves the aforementioned problems in a straight forward and simple manner. What is provided is a brake light system for helmets which includes a helmet, a helmet brake light coupled to the rear of the helmet, a light intensity detector coupled in close proximity to the motorcycle's brake light and an electrical cable electrically coupled to the helmet brake light and the light intensity detector wherein when the motorcycle's brake light illuminates, the light intensity detector detects the illumination of the motorcycle's brake light and activates the helmet brake light.

The helmet brake light system of the present invention used in conjunction with a rear brake light of a motorcycle or an open motorized recreational vehicle comprises: a helmet; a helmet brake light coupled to a rear portion of the helmet; a means for detecting the illumination of said rear brake light coupled in close proximity to said rear brake light; and an electrical connector cable electrically coupled to said helmet brake light and said means for detecting the illumination of said rear brake light wherein, when the illumination of said rear brake light is detected by said means for detecting the illumination of said rear brake light, said helmet brake light is turned on.

In view of the above, an object of the present invention is to provide a helmet brake light system which adds an additional brake light to a helmet to enhance the visibility of the brake light by tailing drivers.

Another object of the present invention is to provide a helmet brake light system which is not electrically connected to the internal brake light system or the electrical system of the motorcycle or other open motorized recreational vehicle.

A further object of the present invention is to provide a helmet brake light system which is activated in response to the illumination intensity defined by the motorcycle's brake light illumination intensity.

It is a still further object of the present invention to provide a helmet brake light system which includes a helmet having a built-in rear brake light accessory integrated into a helmet and a battery source embedded in the padding of the helmet.

In view of the above objects, it is a feature of the present invention to provide a helmet brake light system which is simple use.

Another feature of the present invention is to provide a helmet brake light system which is relatively simple structurally and thus easy to manufacture.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
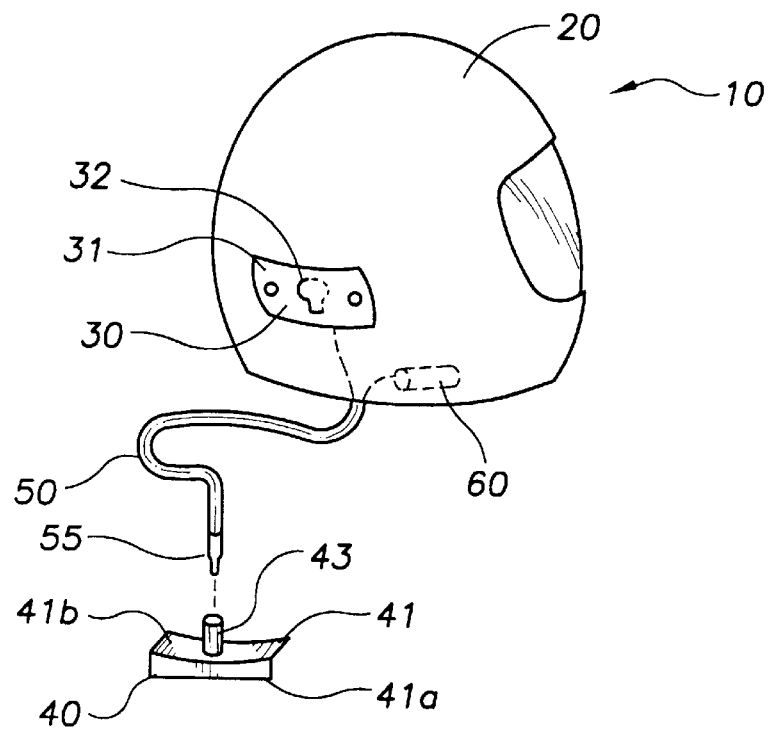
FIG. 1 illustrates a perspective view of the preferred embodiment of helmet brake light system of the prevent invention.
Figure 3:
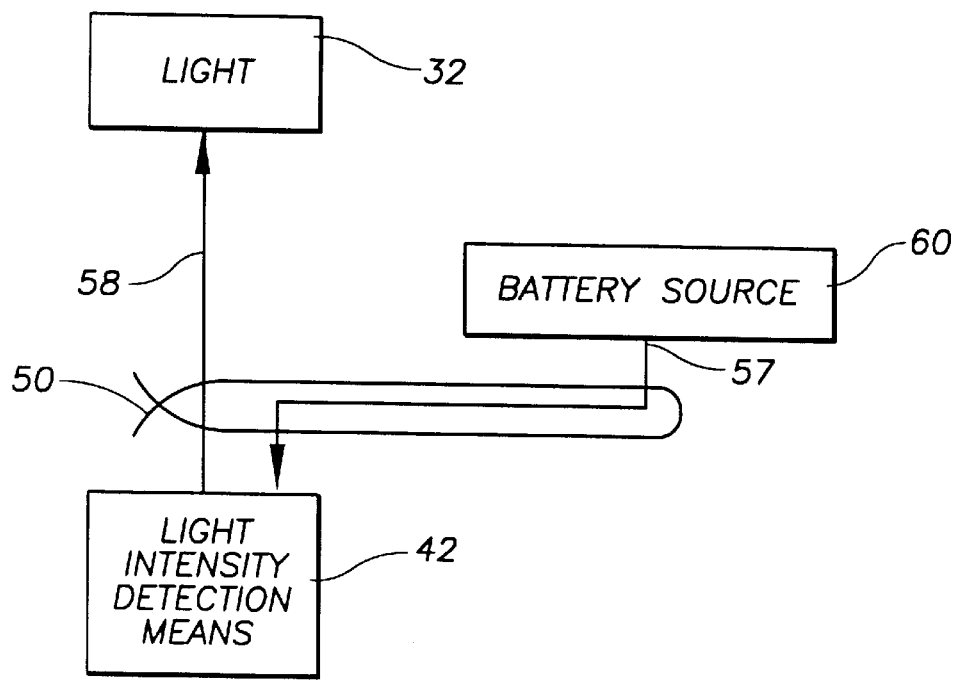
Figure 2:
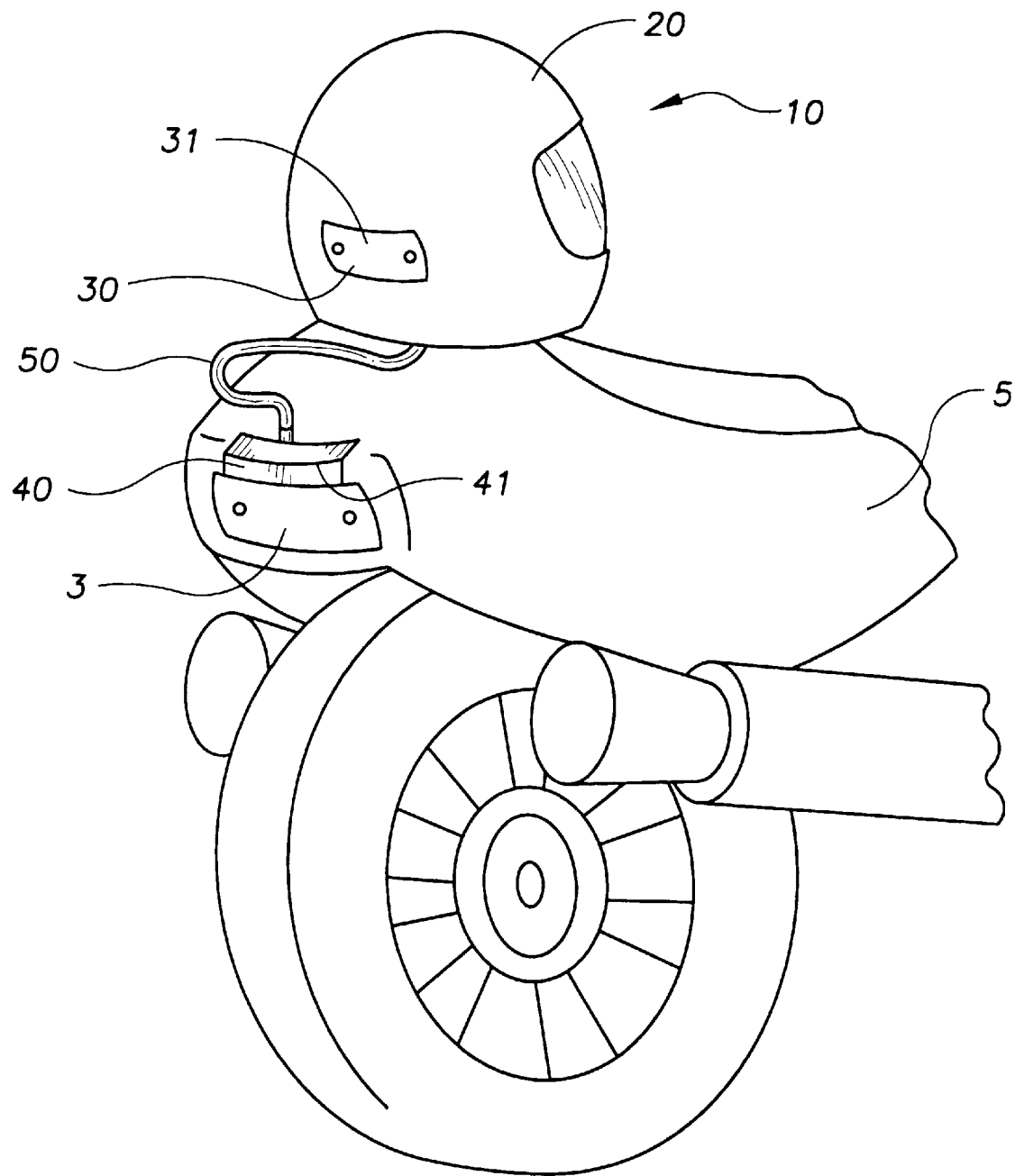
FIG. 2 illustrates a perspective view of the preferred embodiment of helmet brake light system of the prevent invention installed; and, FIG. 3 illustrates a block diagram of the helmet brake light system of the present invention.

Referring now to the drawings, and in particular FIGS. 1–3, the helmet brake light system of the present invention is designated generally by the numeral 10. Helmet brake light system 10 is comprised of helmet 20, helmet brake light 30, light intensity detector 40, electrical connector cable 50 and battery source 60.

Motorcycle 5 includes rear brake light 3 which a illuminated when the brake pedal of the motorcycle 5 is depressed. The intensity of the illumination of brake light 3 is greater than the rear light when the lights are turned on such as during the night time hours. Henceforth, light intensity detector 40 is set with a predetermined intensity illumination threshold to prevent the erroneous activation of helmet brake light 30 when the motorcycle's rear light is on. In operation, light intensity detector 40 detects the illumination of rear brake light 3 of motorcycle 5 or other open motorized recreational vehicle when rear brake light 3 illuminates.

Helmet 20 is generally a standard helmet readily available and includes interior padding for protecting the rider's head. Helmet 20 differs from the standard helmet in that the rear of helmet 20 has formed therein an aperture (not shown).

Helmet brake light 30 comprises transparent light cover 31 and at least one light 32. Transparent light cover 31 is generally rectangularly shaped but curved to the curvature of helmet 20. In the preferred embodiment, transparent light cover 31 is made of transparent red-colored plastic or the like. Positioned directly behind the transparent light cover 31 is the at least one light 32 so that the at least one light 32 illuminates through the transparent light cover 31.

Transparent light cover 31 is cover the aperture (not shown) formed in the rear of helmet 20 wherein the aperture has journalled therethrough a portion of the at least one light 32.

Battery source 60 is embedded in the padding of helmet 20. Battery source 60 should be centered in helmet 20 so that helmet 20 is not off balance when worn. Battery source 60 is electrically connected to light intensity detector 40 via electrical connector cable 50. One free end of electrical connector cable 50 is fixedly attached to the rear of helmet 20. Thereby, the vibratory forces or other shock forces in combination with gravitational forces do not cause the separation of electrical connector cable 50 from helmet 20.

Light intensity detector 40 comprises housing 41, light intensity detection means 42 and cable connector 43. Housing 41 supports therein light intensity detection means 42. The rear panel of housing 41 is securable to the motorcycle. In the preferred embodiment, rear panel is adhesively secured to motorcycle in very close proximity to the motorcycle's brake light 3. In the exemplary embodiment, a portion of the rear panel slightly overlaps the top portion of the motorcycle's brake light 3. Nevertheless, in lieu of adhesively securing the rear panel of housing 41 to the motorcycle, other means of securing, such as, without limitation, screws, suction cups, etc., may be substituted.

Housing 41 is transparent so that the illumination of brake light 3 exterior of housing 41 can be detected by the interior light intensity detection mens 42. Housing 41 is generally L-shaped defining a vertical portion 41a and a horizontal portion 41b. The rear panel of the vertical portion 41a slightly overlaps the motorcycle's brake light 3. Horizontal portion 41b of housing 41 has coupled thereto cable connector 43 wherein the other free end of electrical connector cable 50 is directly coupled to cable connector 43. In the preferred embodiment, cable connector 43 provides for a quick disconnect for detaching the other free end of electrical cable 50 therefrom. In the exemplary embodiment, cable connector 43 is a jack and the other free end of electrical cable 50 is provided with plug 55 receivable in the jack of cable connector 43. Plug 55 is friction fit coupled in the jack. Henceforth, helmet 20 can be removed from motorcycle 5 as desired and needed. The jack/plug connector defined by plug 55 and cable connector 43 allows light intensity detector 40 to remain attached to motorcycle 5 or other open motorized recreational vehicle. When the rider rides the motorcycle 5 or other open motorized recreational vehicle, helmet 20 is placed on the head of the rider and plug 55 inserted into the jack of cable connector 43. Referring now to FIG. 3, battery source 60 is electrically coupled to light intensity detection means 42 when plug 55 of electrical connector cable 50 is coupled in the jack of cable connector 43. When plug 55 is disconnected from the jack of cable connector 43 the battery source 60 is disconnected from light intensity detection means 42. Battery source 60 delivers power to light intensity detection mens 42 via wire 57 of electrical connector cable 50.

When light intensity detection means 42 detects the illumination of the motorcycle's brake light 3, a turn on signal (power) is sent on wire 58 of electrical connector cable 50 to the at least one light 32 to illuminate the at least one light 32. In other words, light intensity detection means 42 detects the intensity of light illumination from brake light 3. If such intensity of light is equal to or above a predetermined intensity illumination threshold, the at least one light 32 is turned on.

In the exemplary embodiment, the signal from light intensity detection means 42 through electrical connector cable 50 powers the at least one light 32 such that the at least one light 32 remains illuminated as long as light intensity detection means 42 detects the illumination of brake light 3. When brake light 3 is turned off, light intensity detection means 42 ceases sending the turn on signal to the at least one light 32 on wire 58 of electrical connector cable 50.

In summary, helmet brake light 30 illuminates when the brake light 3 of the motorcycle 5 or other open motorized recreation vehicle is illuminated. Therefore, the light intensity detection means detects the illumination of brake light 3. As can be appreciated, the helmet brake light system 10 of the present invention is not electrically connected to the electrical system or brake light 3 of the motorcycle 5 or other open motorized recreation vehicle.

It is noted that the embodiment of the helmet brake light system described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A helmet brake light system for use in conjunction with a rear brake light of a motorcycle or an open motorized recreational vehicle comprising:

a helmet;

a helmet brake light coupled to a rear portion of the helmet;

a means for detecting the illumination of said rear motorcycle brake light coupled in close proximity to said rear motorcycle brake light;

an electrical connector cable electrically coupled to said helmet brake light and said means for detecting the illumination of said rear motorcycle brake light wherein, when the illumination of said rear motorcycle brake light is detected by said means for detecting the illumination of said rear motorcycle brake light, said helmet brake light is turned on;

a battery source housed in said helmet and electrically coupled to said means for detecting the illumination of said rear motorcycle brake light through said electrical connector cable, one free end of said electrical connector cable being fixedly coupled to said helmet and the other free end of said electrical connector cable is removably coupled to said means for detecting the illumination of said rear motorcycle brake light;

said helmet brake light system further comprising a housing for housing therein said means for detecting the illumination of said rear motorcycle brake light and a jack coupled to said housing.

2. The helmet brake light system of claim 1, wherein said other free end of said electrical connector cable includes a plug which is removably coupled in said jack.

3. The helmet brake light system of claim 1, wherein said housing is adhesively secured in close proximity to said rear brake light.

4. A helmet brake light system for use in conjunction with a rear brake light of a motorcycle or an open motorized recreational vehicle comprising:

a helmet;

a helmet brake light coupled to a rear portion of the helmet;

a means for detecting the illumination of said rear motorcycle brake light coupled in close proximity to said rear motorcycle brake light; and an electrical connector cable electrically coupled to said helmet brake light and said means for detecting the illumination of said rear motorcycle brake light wherein, when the illumination of said rear motorcycle brake light is detected by said means for detecting the illumination of said rear motorcycle brake light, said helmet brake light is turned on;

said means for detecting the illumination of said rear motorcycle brake light detecting the illumination of said motorcycle brake light when a light intensity from said rear rear motorcycle brake light is equal to or above a predetermined intensity illumination threshold.

5. A helmet brake light system for use in conjunction with a rear brake light of a motorcycle or an open motorized recreational vehicle comprising:

a helmet;

a helmet brake light coupled to a rear portion of the helmet;

a means for detecting the illumination of said rear motorcycle brake light coupled in close proximity to said rear motorcycle brake light;

an electrical connector cable electrically coupled to said helmet brake light and said means for detecting the illumination of said rear motorcycle brake light wherein, when the illumination of said rear motorcycle brake light is detected by said means for detecting the illumination of said rear motorcycle brake light, said helmet brake light is turned on;

a battery source housed in said helmet and electrically coupled to said means for detecting the illumination of said rear motorcycle brake light through said electrical connector cable, one free end of said electrical connector cable being fixedly coupled to said helmet and the other free end of said electrical connector cable being removably coupled to said means for detecting the illumination of said rear motorcycle brake light; and a housing for housing therein said means for detecting the illumination of said rear motorcycle brake light and a jack coupled to said housing.

6. The helmet brake light system of claim 5, wherein said other free end of said electrical connector cable includes a plug which is removably coupled in said jack.

7. The helmet brake light system of claim 5, wherein said housing is adhesively secured in close proximity to said rear brake light.

8. The helmet brake light system of claim 5, wherein said means for detecting the illumination of said rear motorcycle brake light detects the illumination of said rear motorcycle brake light when a light intensity from said rear motorcycle brake light is equal to or above a predetermined intensity illumination threshold.

* * * * *